United States Patent
Chernoff et al.

(10) Patent No.: US 6,793,275 B1
(45) Date of Patent: Sep. 21, 2004

(54) LOAD-BEARING BODY PANEL ASSEMBLY FOR A MOTOR VEHICLE

(75) Inventors: Adrian B. Chernoff, Royal Oak, MI (US); Tommy E. White, Rochester Hills, MI (US); Christopher E. Borroni-Bird, Oakland Township, MI (US)

(73) Assignee: General Motors Corporation, Detroit, MI (US)

( * ) Notice: Subject to any disclaimer, the term of this patent is extended or adjusted under 35 U.S.C. 154(b) by 31 days.

(21) Appl. No.: 10/305,379

(22) Filed: Nov. 26, 2002

Related U.S. Application Data

(60) Provisional application No. 60/333,548, filed on Nov. 27, 2001.

(51) Int. Cl.[7] .................................................. B60N 2/44
(52) U.S. Cl. ............................ 296/193.11; 296/193.04; 296/203.02; 296/187.09; 180/69.2
(58) Field of Search ........................... 296/185, 187.01, 296/191, 193.01, 193.04, 193.09, 193.1, 193.11, 203.02, 187.09, 193.03, 181.1; 180/69.2, 69.21, 69.22

(56) References Cited

U.S. PATENT DOCUMENTS

| | | | |
|---|---|---|---|
| 2,606,625 A | | 8/1952 | Paton ........................... 180/60 |
| 2,723,154 A | | 11/1955 | Barenyi ........................ 296/28 |
| 2,886,373 A | * | 5/1959 | Barenyl ....................... 296/191 |
| 3,730,582 A | * | 5/1973 | Lieffring ................. 296/203.02 |
| 4,308,307 A | * | 12/1981 | Heath et al. ................. 428/167 |
| 4,634,167 A | * | 1/1987 | Moriki et al. .................. 296/76 |
| 4,832,399 A | * | 5/1989 | Kosuge .................. 296/203.02 |
| 5,000,997 A | | 3/1991 | Ritchie et al. ................. 428/78 |
| 5,124,191 A | * | 6/1992 | Seksaria ....................... 428/178 |
| 5,149,167 A | * | 9/1992 | Rieck et al. ................. 296/191 |
| 5,562,329 A | | 10/1996 | Srock et al. .................. 296/203 |
| 5,605,371 A | | 2/1997 | Borchelt et al. ............. 296/188 |
| 5,706,908 A | * | 1/1998 | Sakai et al. ................. 180/69.2 |
| 5,806,620 A | | 9/1998 | DeRees et al. ........... 180/69.21 |
| 5,833,024 A | * | 11/1998 | Kaneko ...................... 180/69.2 |
| 5,882,064 A | | 3/1999 | Emmons ...................... 296/197 |
| 5,974,847 A | | 11/1999 | Saunders et al. ............... 72/57 |
| 6,048,022 A | * | 4/2000 | Ishibashi et al. ....... 296/187.09 |
| 6,179,364 B1 | | 1/2001 | Takahashi ..................... 296/76 |
| 6,250,710 B1 | | 6/2001 | Matsuzaki .................. 296/188 |
| 6,253,588 B1 | | 7/2001 | Rashid et al. .................. 72/57 |
| 6,513,617 B2 | | 2/2003 | Sasaki et al. ............... 180/274 |
| 6,568,495 B1 | * | 5/2003 | Corder et al. .............. 180/69.2 |
| 2003/0150656 A1 | * | 8/2003 | Hyslop et al. ........... 180/69.21 |

OTHER PUBLICATIONS

Model Guide: Audi A2 press release, pp. 1–9, Feb. 25, 2000.*
Mechanical Design, SerialcomDesign, "Limited Only By The Human Mind", ECOBASIC , pp. 1–3, 2001.
Model Guide: Audi A2 press release 091499, pp. 1–5, 1999.

* cited by examiner

Primary Examiner—D. Glenn Dayoan
Assistant Examiner—Patricia Engle
(74) Attorney, Agent, or Firm—Kathryn A. Marra

(57) ABSTRACT

A body panel functions as a hood by at least partially concealing an engine compartment, and functions as a structural load-bearing portion of a vehicle frame by structurally interconnecting vehicle frame members. The body panel preferably includes a hood portion and two fender portions.

22 Claims, 5 Drawing Sheets

LOAD-BEARING BODY PANEL ASSEMBLY FOR A MOTOR VEHICLE

CROSS-REFERENCE TO RELATED APPLICATION

This application claims the benefit of U.S. Provisional Application 60/333,548, filed Nov. 27, 2001, which is hereby incorporated by reference in its entirety.

TECHNICAL FIELD

The present invention relates to vehicular body panels that function as both hoods and vehicle frame portions by structurally interconnecting vehicle frame members.

BACKGROUND ART

Motor vehicle front ends typically have a plurality of structural load-bearing frame members. The load-bearing frame members partially form an engine compartment used to house various vehicular components, including steering system components, braking system components, and powerplant components.

The load-bearing frame members are subjected to significant stresses. A suspension system with wheels is mounted with respect to at least some of the load-bearing frame members, and transfers loads to frame members. These loads are caused by forces encountered in regular vehicle operation: irregularities in the road exert a vertical force on wheels that are transmitted to frame members; forces related to the linear acceleration or deceleration of the vehicle relative to a road surface are transmitted from the wheels to frame members; and forces related to the lateral acceleration of the vehicle relative to the road surface are transmitted from the wheels to frame members. Furthermore, the vehicular components in the engine compartment are mounted to at least some of the load-bearing frame members, which therefore bear the weight of the vehicular components. In the event of a frontal impact, the frame members must bear or absorb energy from the impact.

In prior art vehicles, a hood is employed to conceal and protect the vehicular components in the engine compartment. The hood opens to provide access to the engine compartment for maintenance and repair of the powerplant and other components. In the prior art, the hood is fixed at only three points, via two hinges, usually placed in the rear of the hood at or near a cowl, and via a releasable latch located at or near an upper tie bar. These three connection points are not totally rigid which allows the conventional hood to pivot relative to the vehicle's body structure.

The prior art hood is thus not suited for bearing loads from, or distributing loads among, structural load-bearing frame members in prior art motor vehicles. The frame members must therefore be larger and more prominent than would otherwise be necessary if the prior art hood were configured to be load-bearing. The size and placement of the frame members are constraints in the exterior design of the vehicle; exterior body panels are shaped to cover the load-bearing frame members.

The prior art hood also exhibits a condition known as overslam travel: during closure of a prior art hood, the hood travels downward past its designed rest position. Overslam travel requires that the hood's design location be slightly higher than its lowest possible position simply because of the fact that the hood is hinged to open. Overslam travel may therefore result in aerodynamic drag.

SUMMARY OF THE INVENTION

A structural load-bearing body panel assembly is provided. The body panel assembly is intended for a vehicle frame having a plurality of load-bearing frame members at least partially defining an engine compartment. The body panel assembly includes an outer panel configured to partially define the exterior surface of a vehicle and a body panel structural member mounted with respect to the outer panel. A hood portion is configured to extend above and over the engine compartment of the vehicle.

The body panel structural member is configured for rigid attachment to each of at least two of the frame members to form a portion of the frame such that the structural member transfers loads between the at least two frame members. Because the loads are distributed, each of the individual frame members carries less of a load than it would in a comparable vehicle with a hood secured only by hinges and a latch. The body panel assembly thus functions as both a hood and a structural load-bearing portion of the vehicle frame.

A vehicle frame employing the structural load-bearing body panel assembly may therefore have smaller or fewer load-bearing frame members than a comparable vehicle with a hood that is not load-bearing. The load-bearing body panel assembly thus reduces vehicle design constraints, enabling the use of a wider range of body panel shapes and sizes.

The load-bearing body panel assembly preferably does not exhibit overslam travel, and may therefore have a lower resting position than a hood exhibiting overslam travel, resulting in improved vehicle aerodynamics.

Preferably, the structural body panel member includes two fender portions, thereby eliminating gaps found in prior art vehicles between the hood and fenders. Fender portions may also be mounted with respect to front hinge pillars, thereby distributing loads among an even greater number of frame members.

A vehicle frame employing the structural load-bearing body panel is also provided.

The above objects, features, and advantages, and other objects features, and advantages, of the present invention are readily apparent from the following detailed description of the best modes for carrying out the invention when taken in connection with the accompanying drawings.

DESCRIPTION OF THE PREFERRED EMBODIMENTS

Figure 1:
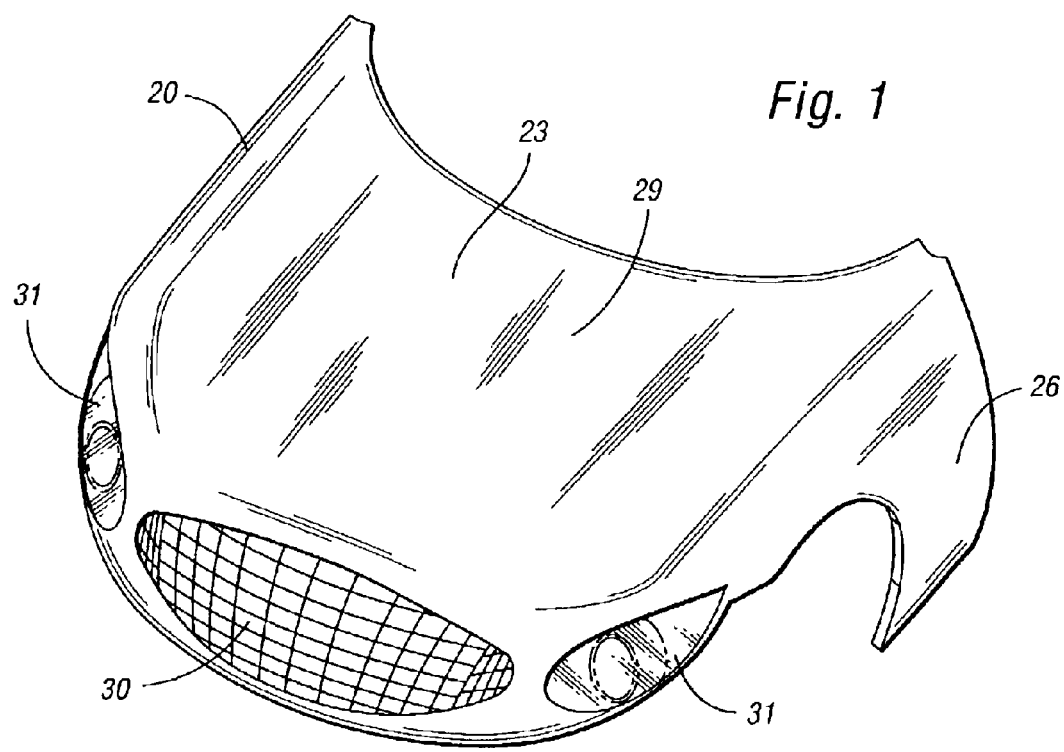
FIG. 1 is a schematic perspective view of a structural load-bearing body panel in accordance with the invention.

FIG. 1 is a schematic depiction of a structural load-bearing body panel assembly 20 which becomes a portion of a vehicle frame, and therefore functions as both a hood and a structural load-bearing frame portion. The body panel assembly 20 has a hood portion 23 configured to extend substantially horizontally above and over a vehicle engine compartment, and fender portions 26 extending substantially vertically from opposite sides of the hood portion 23. An outer panel 29 defines part of the exterior surface of the body panel assembly 20 and partially defines the exterior surface of a vehicle. The outer panel 29 performs a primarily aesthetic function. The body panel assembly 20 is preferably a preassembled unit and includes a grill 30 and headlights 31.

Figure 2:
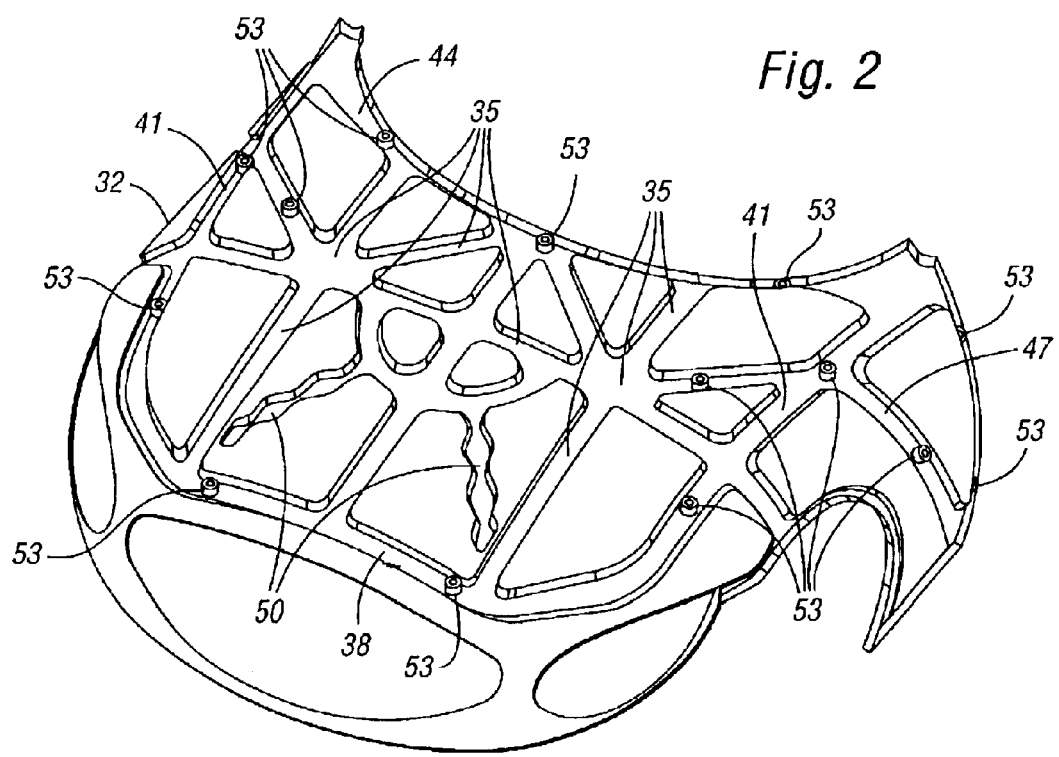
FIG. 2 is a schematic perspective view of an inner panel of the body panel of FIG. 1.

The outer panel is fastened to an inner panel 32, depicted schematically in FIG. 2. Those skilled in the art will recognize a variety of fastening techniques that may be used to fasten the outer panel to the inner panel 32. In the preferred embodiment, hemming is employed.

Referring again to FIG. 2, wherein like reference numbers refer to like components from FIG. 1, the inner panel 32 serves as a structural member for the body panel assembly 20, providing the body panel assembly 20 with sufficient stiffness and strength to bear loads exerted upon it by vehicle frame members to which it is attached. Other structural members, such as rods or tubes, may be mounted to the outer panel within the scope of the claimed invention. The inner panel 32 is characterized by formations 35 configured to provide the inner panel 32 with structural integrity.

Some of the formations are configured to bear or transfer loads that certain specific frame elements on a vehicle typically bear or transfer; these formations are configured to act as vehicle frame members that are an integral part of the body panel assembly. Integral frame member formations include an integral tie bar formation 38, integral upper rail formations 41, and an integral cowl bar formation 44. The integral vehicle frame member formations may be used in conjunction with a corresponding non-integral vehicle frame member to assist the non-integral frame member, or the integral frame member may entirely replace the corresponding non-integral frame member. For example, the integral upper rail formations 41 may be used with upper rails, facilitating the use of smaller, less prominent upper rails. Alternatively, the integral upper rail formations may facilitate the elimination of upper rails in a vehicle body by performing the functions of upper rails.

A formation 47 is configured to improve structural rigidity for bearing loads from front hinge pillars. Other formations 50 are configured to absorb energy in the event of a frontal impact.

Clench nuts 53 mounted to the inner panel 32 serve as attachment couplings configured to rigidly mount the body panel assembly 20 to load-bearing frame members on a vehicle. Those skilled in the art will recognize a variety of rigid and releasable fasteners and fastening systems that may be employed within the scope of the claimed invention.

The outer panel and the inner panel are preferably each one piece and formed using sheet hydroforming, quick plastic forming, or superplastic forming. Quick plastic forming is described in U.S. Pat. No. 6,253,588, issued Jul. 3, 2001 to Rashid, et al, which is hereby incorporated by reference in its entirety. Superplastic forming is described in U.S. Pat. No. 5,974,847, issued Nov. 2, 1999 to Saunders, et al, which is hereby incorporated by reference in its entirety.

Figure 3:
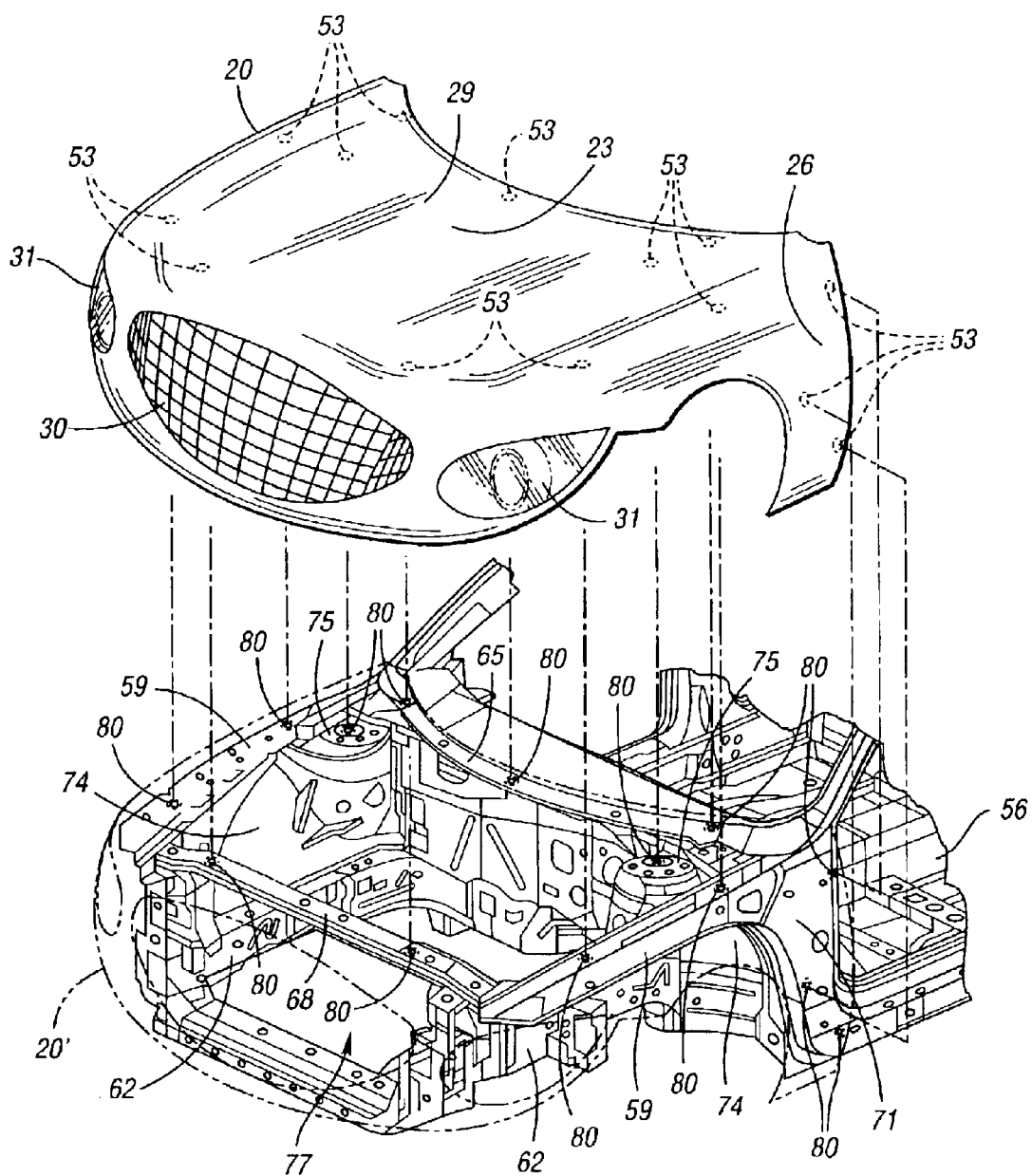
FIG. 3 is a schematic perspective view of a vehicle frame in an attachment scenario with the body panel of FIG. 1.

FIG. 3, wherein like reference numbers refer to like components from FIGS. 1 and 2, is a schematic perspective illustration of the front and partial left side of a vehicle frame 56 forming part of a vehicle. The vehicle frame 56 has a plurality of structural load-bearing body frame members, including upper rails 59; mid-rails 62; a cowl bar 65; an upper tie bar 68; front hinge pillars 71; and front wheelhouses 74 having shock towers 75. Some of the load-bearing body-frame members partially form an engine compartment 77.

The upper rails 59 extend substantially longitudinally from the front hinge pillars 71 forward to the upper tie bar 68, and partially define the upper extent of the engine compartment 77. The upper tie bar 68 is a cross member that extends substantially transversely and partially defines the upper and forward extent of the engine compartment 77. The cowl bar 65 is a cross member that extends substantially transversely and partially defines the upper and rearward extent of the engine compartment 77. Mid rails 62, also referred to as "lower rails," extend substantially longitudinally at a lower height than the upper rails 59. The mid rails 62 are inboard of the upper rails 59 to accommodate wheels. Front wheelhouses 74 extend from the mid rails 62 to the upper rails 59. Shock towers 75 house various suspension components (not shown).

The engine compartment 77 is used to house various vehicular components, including steering system components, braking system, components, and powerplant components. The term "engine compartment" is non-limiting with respect to the nature or type of powerplant employed; thus, within the scope of the claimed invention, the vehicle 56 may employ any powerplant, such as a conventional internal combustion engine, an electric motor, a fuel cell, a hybrid-electric system, etc.

The upper rails 59, front hinge pillars 71, cowl bar 65, shock towers 75, and upper tie bar 68 each include complementary attachment couplings 80 positioned to align with the attachment couplings on the inner panel. In the embodiment depicted, the complementary attachment couplings 80 are holes through which threaded bolts (not shown) are placed to engage the clench nuts 53 on the body panel assembly 20. The attachment couplings 53, 80 are preferably releasably engageable so that the body panel assembly 20 is removable in the event that vehicular componentry in the engine compartment 77 requires repair or replacement.

The body panel is shown in phantom 20' rigidly mounted with respect to each of the upper rails 59, cowl bar 65, front hinge pillars 71, shock towers 75, and upper tie bar 68. In the context of the present invention, the body panel assembly 20 is "rigidly mounted" with respect to a frame member if a connection between the body panel assembly 20 and the frame member is configured to bear and transfer loads and moments between the body panel assembly 20 and the frame member irrespective of load vector. For example, the body panel assembly 20 would not be rigidly mounted to a frame member if the only locking or fastening element interjacent the body panel and the frame member is a hinge; by design, a hinge cannot support a moment, and the body panel assembly 20 could pivot relative to the frame member.

Figure 4:
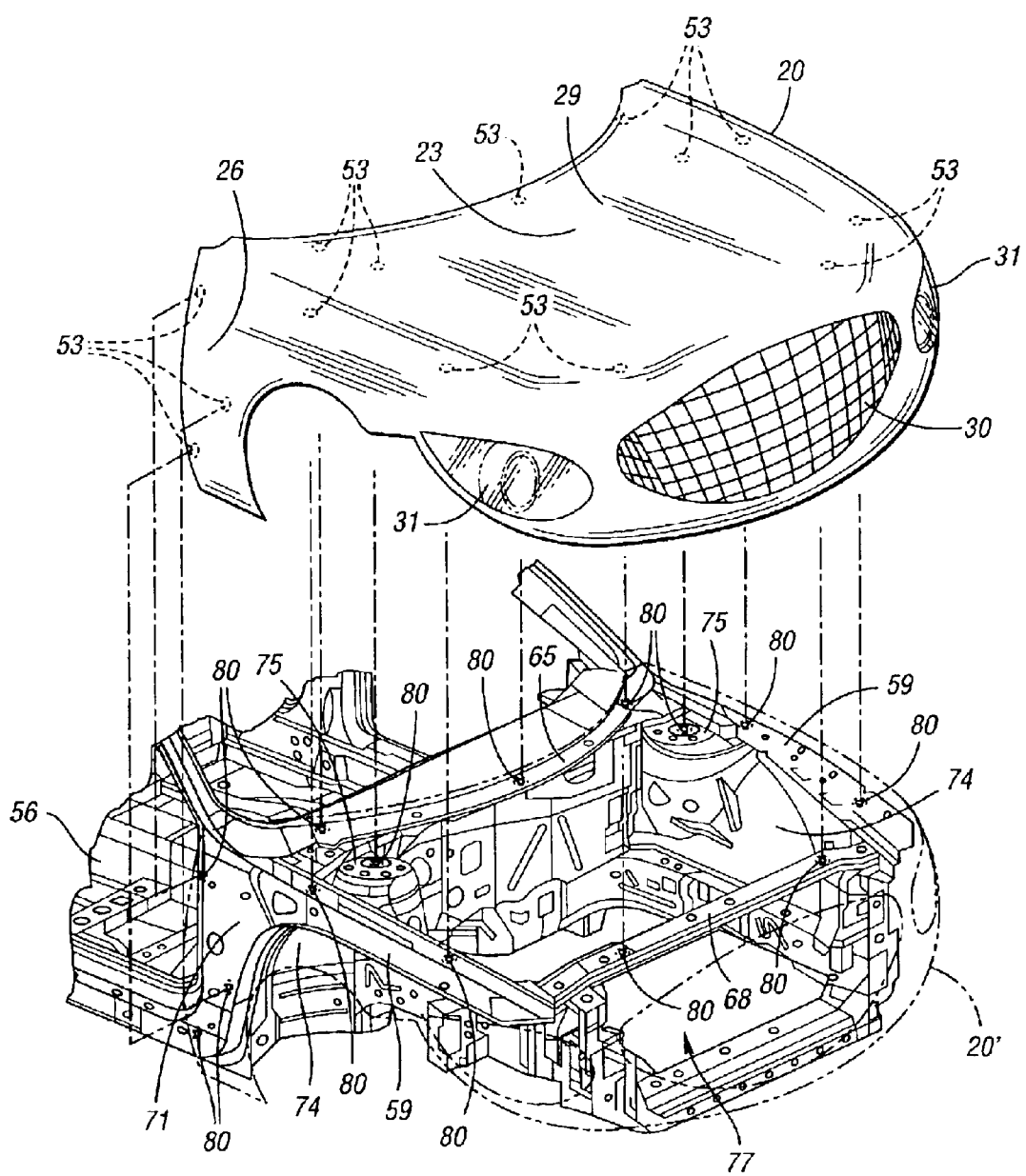
FIG. 4 is another schematic perspective view of the vehicle frame of FIG. 3 in an attachment scenario with the body panel of FIG. 1.

The loads borne by the frame members are smaller than those of conventional vehicles because the load-bearing body panel assembly 20 distributes loads among the frame members. As a result, the frame members need not be as large or prominent as they are in the prior art. For example, the upper rails 59, cowl bar 65, and upper tie bar 62 each have an open section form, as opposed to a closed box form found in the prior art. FIG. 4, wherein like reference numbers refer to like components from FIGS. 1–3, shows the front and partial right side of the vehicle frame 56 and body panel assembly 20.

Figure 5:
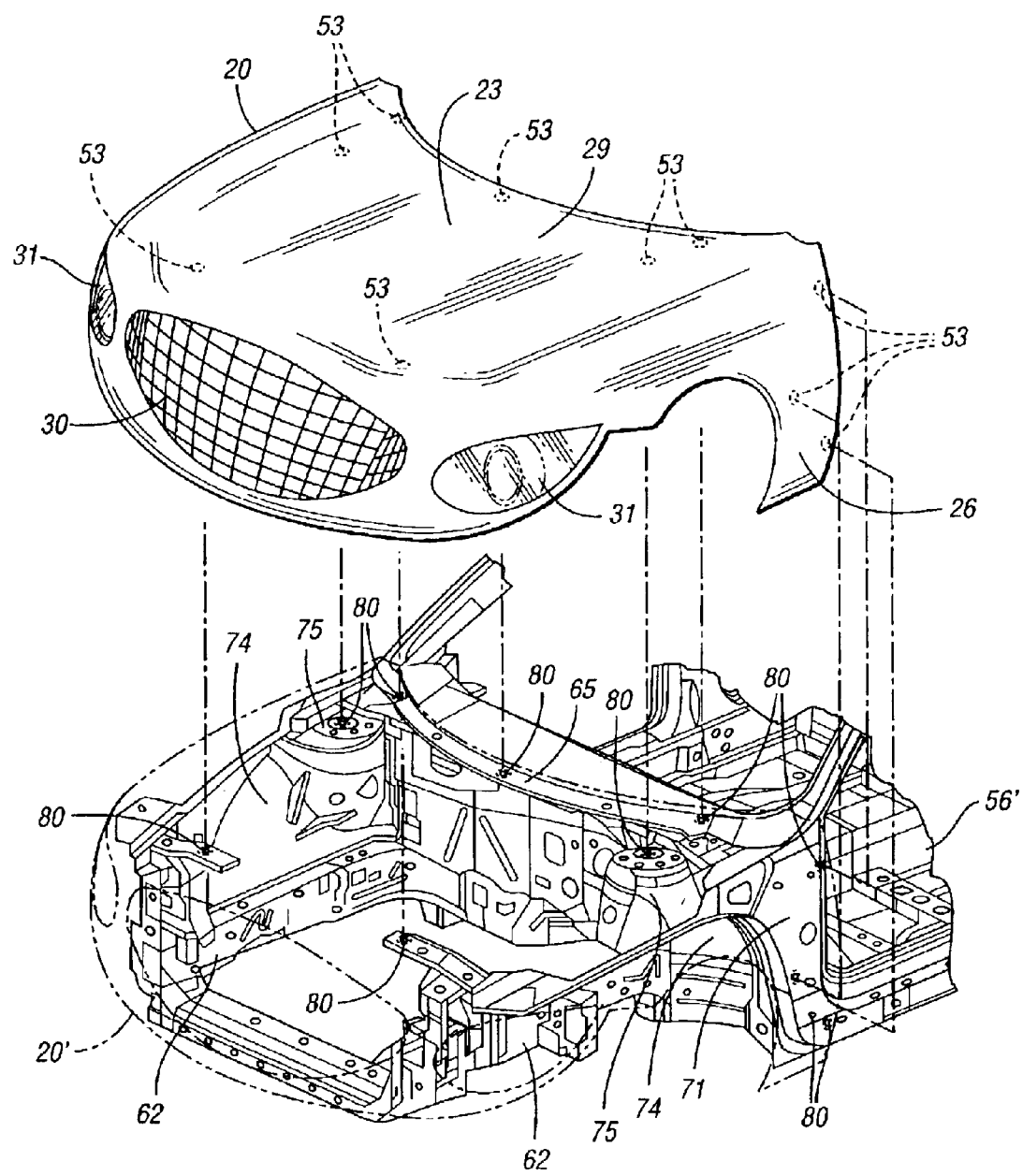
FIG. 5 is a schematic perspective view of an alternative vehicle frame structure in an attachment scenario with the body panel of FIG. 1.

Referring to FIG. 5, wherein like reference numbers refer to like components from FIGS. 1–4, a vehicle frame 56' with an alternative frame configuration is schematically depicted.

The vehicle frame 56' does not have upper rails or an upper tie bar. The body panel assembly 20' is rigidly mounted to the cowl bar 65, front hinge pillars 71, and shock towers 75 (some of the clench nuts 53 on the body panel assembly 20, 20' depicted in FIGS. 2–4 are not depicted in FIG. 5 for clarity). The body panel assembly 20' functions as a structural member, transferring loads between the front hinge pillar 71, the cowl bar 65, and the front wheelhouses 74, and replaces an upper tie bar and upper rails found in conventional vehicles.

Figure 6:
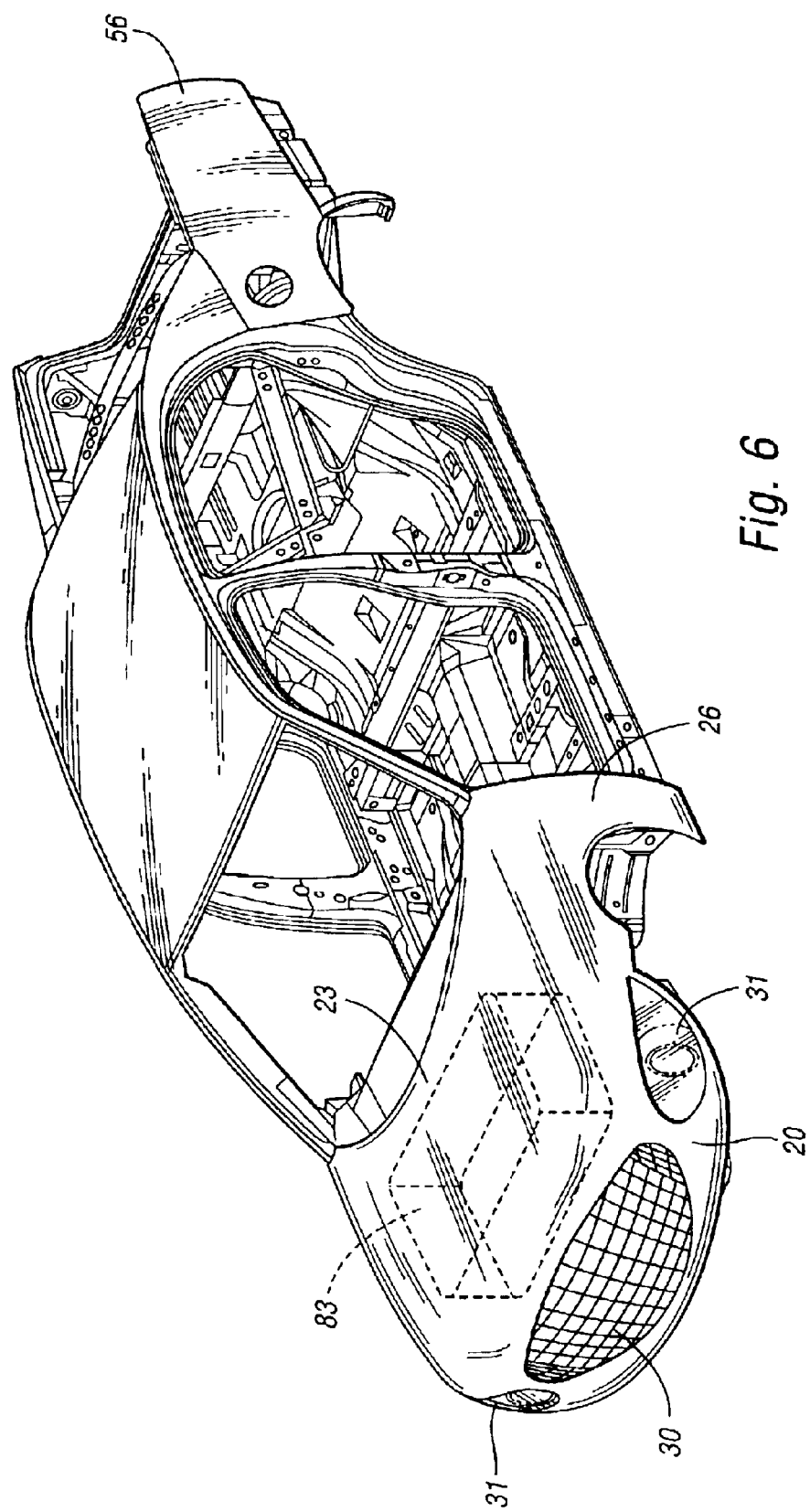
FIG. 6 is a schematic perspective view of the body panel of FIG. 1 rigidly mounted to a vehicle frame.

FIG. 6, wherein like reference numbers refer to like components from FIGS. 1–5, is a schematic depiction of the vehicle frame 56 with the body panel assembly 20 rigidly mounted to frame members. The hood portion 23 extends above and across the engine compartment, thereby protecting vehicular components contained therein, including a powerplant 83. The powerplant 83 and other underhood vehicular components are preferably designed to perform for a significant amount of time without requiring repair or replacement. The powerplant 83 is preferably configured to operate without repair or replacement for the first one hundred thousand miles of vehicle travel.

The body panel assembly 20 does not exhibit overslam travel because it is rigidly mounted to the vehicle frame members. Since the body panel assembly 20 is rigidly mounted to frame members, access to battery terminals for battery recharging or jump-starts, oil fill, windshield solvent fill, and powerplant coolant fill is preferably provided in a location that does not require the removal of the body panel assembly 20. For example, access may be provided in a trunk area, or behind a removable or retractable panel in the front of the vehicle frame 56.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the apppended claims.

What is claimed is:

1. A vehicle frame for a vehicle, the vehicle frame comprising:
   a plurality of structural load-bearing frame members including
      two front hinge pillars,
      at least one cross member mounted with respect to the two front hinge pillars and partially defining an engine compartment, and
      two rails mounted with respect to the at least one cross member and further partially defining the engine compartment; and
   a body panel assembly;
   wherein the body panel assembly has a hood portion extending above and over at least part of the engine compartment so that the body panel assembly functions as a hood; and
   wherein the body panel assembly is rigidly mounted to at least two frame members of the plurality of frame members so that the body panel assembly is configured to transfer loads between said at least two frame members irrespective of load vector and thereby forms a portion of the frame by structurally interconnecting said at least two frame members.

2. The vehicle frame of claim 1, wherein the body panel assembly includes two fender portions, each of the fender portions extending generally vertically from opposite sides of the hood portion.

3. The vehicle frame of claim 2, wherein the at least one cross member includes a cowl bar and a tie bar; wherein the two rails are upper rails; and wherein said at least two frame members include the cowl bar, tie bar, and the upper rails so that loads are transfer between the cowl bar, tie bar, and upper rails through the body panel assembly, thereby allowing the upper rail, tie bar, and cowl bar to be designed considering the load transference.

4. The vehicle frame of claim 2, wherein the body panel assembly is non-pivotably mounted to at least two of the frame members.

5. The vehicle frame of claim 2, wherein the body panel assembly is preassembled and further includes headlights and a grill.

6. The vehicle frame of claim 2, wherein the body panel assembly includes:
   an outer panel partially defining the exterior surface of the vehicle, and
   at least one body panel structural member mounted with respect to the outer panel and configured to transfer loads between the at least two frame members.

7. The vehicle frame of claim 6, wherein said at least two frame members include two front wheelhouses.

8. The vehicle frame of claim 6, wherein said at least two frame members include the two front hinge pillars.

9. The vehicle frame of claim 6, wherein the body panel assembly is rigidly mounted with respect to the at least two frame members such that the body panel assembly does not exhibit overslam travel.

10. The vehicle frame of claim 6, wherein the body panel structural member is an inner panel characterized by formations configured to provide the body panel assembly with structural rigidity.

11. The vehicle frame of claim 10, wherein the formations include an integral upper tie bar cross member.

12. The vehicle frame of claim 10, wherein the two rails are lower rails, and wherein the formations include two integral upper rails.

13. The vehicle frame of claim 11, wherein said at least two frame members include the two front hinge pillars, and wherein the formations are configured to transfer loads between the front binge pillars.

14. The vehicle frame of claim 10, wherein the inner panel and outer panel are each one piece and are formed by quick plastic forming.

15. The vehicle frame of claim 10, wherein the inner panel and outer panel are each one piece and are formed by superplastic forming.

16. The vehicle frame of claim 10, wherein the inner panel and outer panel are each one piece and are formed by sheet hydroforming.

17. The vehicle frame of claim 2, wherein at least one of the frame members has an open cross section form.

18. A preassembled body panel assembly for a vehicle frame, the vehicle frame partially forming a vehicle and having a plurality of structural load-bearing frame members at least partially defining an engine compartment, the body panel assembly comprising:
   an outer panel configured to partially define the exterior surface of the vehicle; and
   at least one body panel structural member mounted with respect to the outer panel;
   a hood portion that is at least partially formed by the outer panel and configured to extend above and over the engine compartment;

a plurality of attachment couplings mounted with respect to the at least one body panel structural member and configured to rigidly attach the body panel assembly to at least two of the frame members such that the at least one body panel structural member is configured to be loads transferred between the at least two frame members irrespective of load vector so that the body panel assembly forms a portion of the frame by structurally interconnecting said structural load-bearing frame members.

19. The body panel assembly of claim 18, wherein the outer panel and the body panel structural member further include two fender portions.

20. The body panel assembly of claim 19, wherein the frame members include two lower rails, at least one cross member, two shock towers, and two front hinge pillars.

21. The body panel assembly of claim 20, wherein the at least one structural member includes an inner panel having formations configured to provide the panel with structural rigidity.

22. A vehicle frame for a vehicle, the vehicle frame comprising:
 a plurality of load-bearing frame members including two front hinge pillars,
 a cowl bar mounted with respect to the two front hinge pills and partially defining an engine compartment, and
 two rails mounted with respect to the at least one cowl bar and further partially defining the engine compartment; and
a preassembled body panel assembly having
 an outer panel partially defining the exterior surface of the vehicle, and
 an inner panel characterized by formations configured to provide the body panel assembly with structural rigidity and mounted with respect to the outer panel;
 wherein the body panel assembly includes a hood portion extending above and over at least part of the engine compartment, and two fender portions, each of the two fender portions extending generally vertically from opposite sides of the hood portion;
wherein the body panel assembly is rigidly mounted to each of the two rails, the two front hinge pillars, and the cowl bar; and
wherein the formations include two integral upper rails and an integral upper tie bar.

* * * * *